Figure 3:
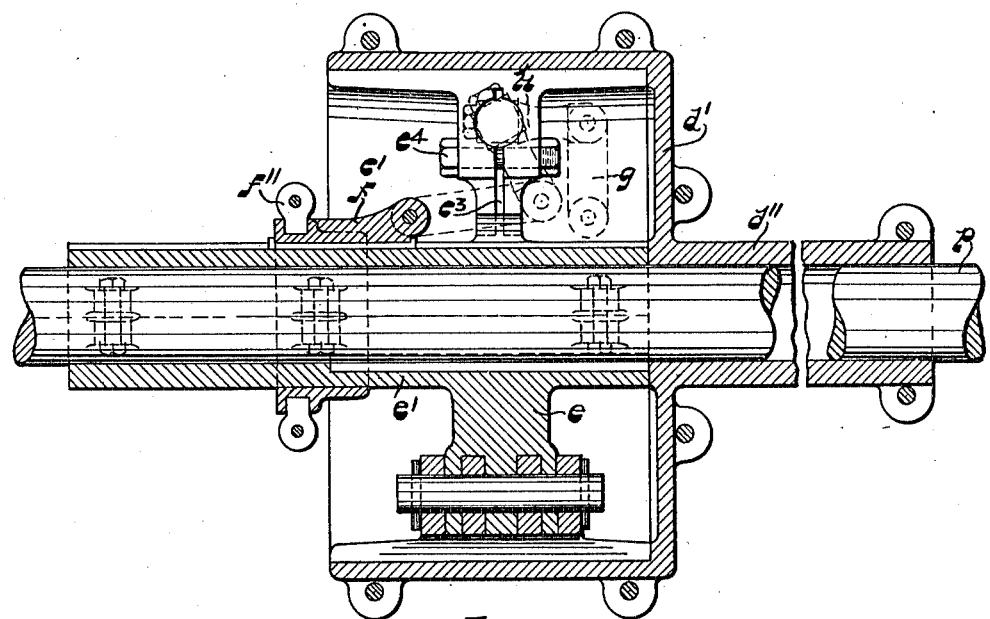

G. L. BROWN.
FRICTION CLUTCH MECHANISM.
APPLICATION FILED DEC. 12, 1905.
1,088,805.
Patented Mar. 3, 1914.
2 SHEETS—SHEET 1.
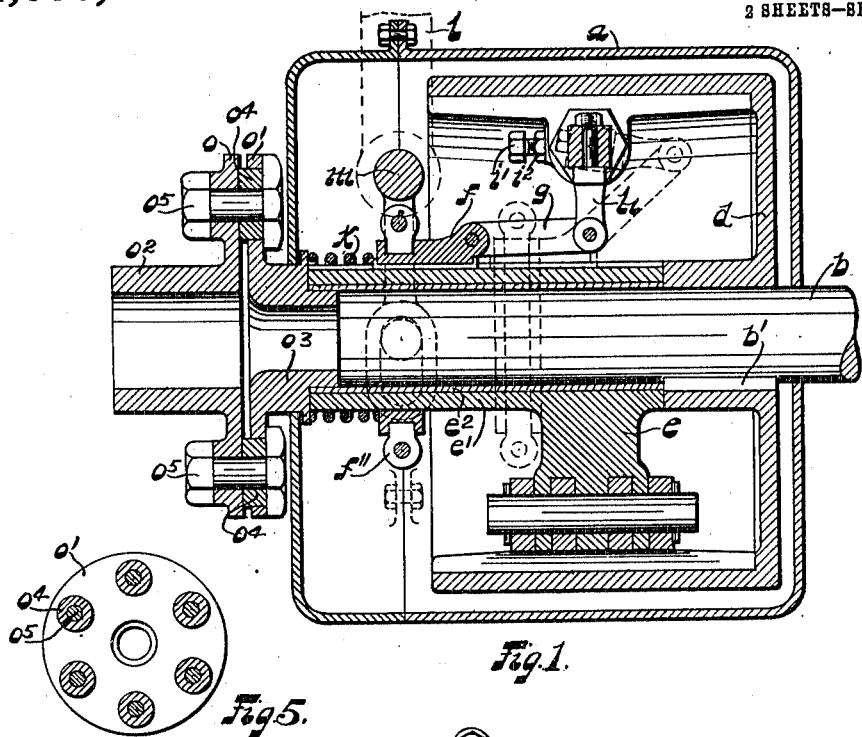
Fig. 1.
Fig. 5.
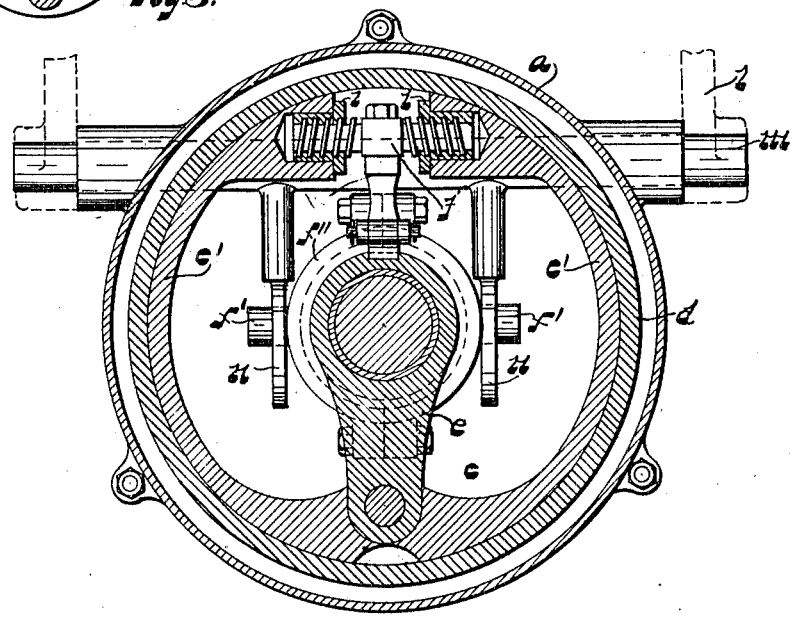
Fig. 2.
Witnesses:
F. H. Swabb.
John F. McDonnell.
Inventor,
George L. Brown,
By
His Attorney.

G. L. BROWN.
FRICTION CLUTCH MECHANISM.
APPLICATION FILED DEC. 12, 1905.

1,088,805.

Patented Mar. 3, 1914.

2 SHEETS—SHEET 2.

Witnesses:
F. H. Swabb.
John F. McDonnell.

Inventor,
George L. Brown,
By His Attorney.

UNITED STATES PATENT OFFICE.

GEORGE LAWRENCE BROWN, OF ELYRIA, OHIO.

FRICTION CLUTCH MECHANISM.

1,088,805.  Specification of Letters Patent.  Patented Mar. 3, 1914.

Application filed December 12, 1905. Serial No. 291,374.

*To all whom it may concern:*

Be it known that I, GEORGE LAWRENCE BROWN, a citizen of the United States of America, and a resident of Elyria, in the county of Lorain and State of Ohio, have invented certain new and useful Improvements in Friction Clutch Mechanism, of which the following is a specification.

My invention relates to improvements in friction clutch mechanism, and has for its object the construction of a clutch device of extremely simple, compact and effective type, adapted for the many uses to which this class of mechanism can be put.

In the accompanying specification, I have indicated two specialized applications of my invention, modified to conform to the needs of an automobile clutch, and of a line-shaft clutch, but these adaptations are merely selected to describe my invention, which is not necessarily limited to the particular details of construction set forth.

It has been apparent to me, that with a slight increase in the strength of construction, and appropriately devised means for effecting a more powerful gripping action, coupled with such design and relation of the respective parts, that the members will fit and operate within each other, a clutch mechanism of unusual driving power, and of small size, could then be made upon commercial lines. Accordingly, I have improved in these particulars, upon clutch mechanism already devised by me, and find the resulting device, one readily lending itself to more effective and wider uses, than are devices of the prior art with which I am acquainted. These improvements are embodied in clutches herewith depicted, wherein the clutch drum contains its co-acting clutch-member, comprising an expansible part, actuated by screw-mechanism into and out of engagement with said drum. The interiorly mounted screw and its operative parts have a wide range of movement, while an adjustment is provided for said screw, of highly effective type, to govern its control of the clutch mechanism.

In one of the types of clutch-mechanism herewith shown, the parts are disposed in an oil-casing, and an interiorly extending controlling-part opposes the tension of a spring, normally forcing the clutch-member into engagement with its drum. Other means may also be employed for operating the clutch-device. Interiorly positioned stops preferably are provided, against which the clutch-member may be drawn, in order to hold it securely out of engagement with the co-acting drum, when in its released position.

Additional features of improvement will be made apparent, by making reference to the accompanying drawings, wherein:—

Figure 4:
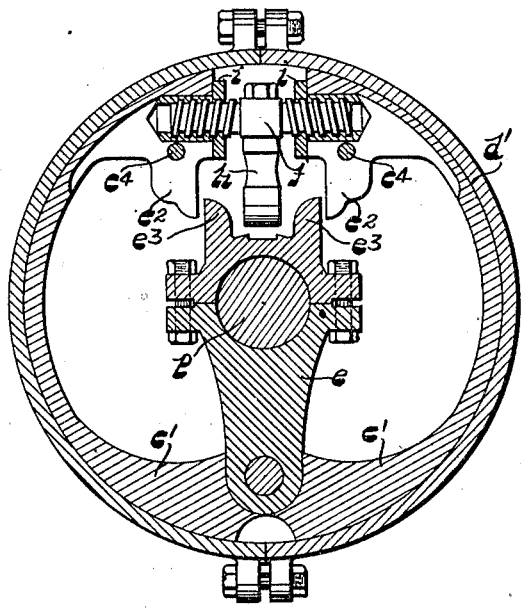

Figure 1, is a longitudinal sectional view of clutch-mechanism of my invention as applied for use upon automobiles, and associated with a novel elastic-coupling member. Fig. 2, is a cross-sectional view through such clutch-mechanism. Fig. 3, is a longitudinal sectional view of a friction clutch of my invention, as applied to a line-shaft. Fig. 4, is a vertical section through such clutch mechanism, and Fig. 5, is a face view upon a smaller scale and partially in section, showing the elastic coupling-member.

Throughout each of the several figures of the drawings, I have employed the same character of reference to indicate similar parts.

Referring first to Fig. 1, it will be seen that the entire clutch-device is contained within an oil-casing $a$; said device thus being adapted for use upon automobiles, motor boats, and in connection with electric motors and other mechanism demanding a smoothly operating clutch and one avoiding wear, as far as possible.

In the device of Fig. 1, shaft $b$ is assumed to be the driving shaft, whereon the key $b'$ securely and rigidly mounts the steel clutch-drum $d$. Within said drum and loosely mounted upon the end of the shaft is the hinged clutch-member $c$, comprising the two semi-circular bronze castings $c'$, pivoted to the depending bracket $e$, which is integral with the sleeve $e'$, having a bronze bushing $e^2$. Upon said sleeve $e'$, is mounted the sliding collar $f$, to which is pivoted the link $g$, connecting the same with arm $h$, centrally secured to the operating-screw $j$. This screw is a right and left hand screw and engages corresponding tapped parts $i$ $i$, carried in recesses provided in the ends of clutch-members $c'$. Each of these sleeve-like tapped parts is secured in position by means of its set screw and lock nut $i^1$ $i^2$. By means of this arrangement, these tapped sleeves may be slightly rotated with respect to the screw and containing clutch-members, so that an adjustment is provided for all wear of the parts. A heavy spring $k$, normally under compression, bears against the sliding collar $f$ and serves to force the same inward as far as the dotted-line position, if necessary, in order to secure the closest engagement of the clutch-member with its driving-drum. The clutch is controlled, however, by means of a lever $l$, connected with the transverse shaft $m$; the same carrying the laterally acting slotted arms $n$, which operate upon the pins $f'$ at the sides of collar $f$. By these means, the clutch may be released through actuating the collar $f$ toward the left and drawing the clutch-member out of engagement with its co-acting drum by means of the right and left hand screw. This spring, of course, may be omitted, but is especially desirable for insuring a normally engaged clutch, adapted for automobile use. At the extreme left of Fig. 1, is shown a simple elastic coupling, also designed for use upon automobiles; the same comprising two opposing flanges $o$ $o'$ upon the driving sleeves $o^2$ $o^3$, the latter of which is secured, as by a pin, to the sleeve $e$. Within the enlarged openings, drilled within flange $o'$, are provided heavy rubber bushings $o^4$, which are placed under compression by means of the connecting bolts and nuts $o^5$, when the parts are secured together. Thus unnecessary strains are avoided and an easier start is insured, than where the clutch and rigid connecting parts are used.

Referring now to the embodiment of my invention, shown in Figs. 3 and 4, it will be seen that several modifications have been made to adapt my improvements for use upon a line-shaft. Thus, all of the parts are formed of two symmetrical halves, necessary to slip over the common line-shaft $p$. The clutch-drum $d'$, in this case, is free to turn, apart from the shaft, while the interior clutch-member $c$ is keyed by means of its mounting sleeve $e$, directly to said line-shaft.

The general construction and operation of the parts will be readily understood from the foregoing description; certain modifications being introduced, however, which I will now describe in detail.

In order to prevent either of the segmental parts $c'$ of the clutch-member $c$, from engaging the drum, while in their released positions, I have provided thereon depending ears or lugs $c^2$, which serve as stops and are brought rigidly into engagement with co-acting stops $e^3$, provided upon the integral sleeve and bracket, which mounts these parts upon the shaft. Thus, when the screw is rotated to release the clutch, said lugs $c^2$ will be closed into engagement with the stops $e^3$ and the clutch-member will be held entirely free from its containing drum.

The recesses in the ends of the segmental clutch-members $c'$ are cut by entering slots $c^3$, and transverse compression-bolts $c^4$ are provided to grasp and retain the sleeves $i$ rigidly in their positions of adjustment; these bolts ordinarily better serving the purpose of the set screws, which are shown in Fig. 1, for performing a like function. The slidable sleeve $f$ is provided with a freely rotatable collar $f''$, which is connected with any suitable means for effecting the longitudinal movement of said sleeve $f$ to control the operation of the clutch. When in its position of withdrawal toward the left of Fig. 3, the clutch-member will be released from the containing drum, while in its extreme right-hand position, the connecting link $g$ will be forced slightly past its vertical position to securely lock the clutch mechanism in operative engagement.

Upon the sleeve extension $d''$, may be mounted any suitable wood, iron or steel pulley for transmitting power through the clutch-mechanism, or if desired, a gear, sprocket or sheave may be similarly used, or where a shorter and more compact construction is required, corresponding parts may be mounted directly upon the exterior face of the drum instead. As to these details, of course, any suitable disposition of the power transmitting mechanism may be adopted by a skilled mechanic.

After considering the foregoing, in connection with the various figures of the drawings, it will be understood that a friction clutch device may be constructed in accordance with the features of my invention, which has a very large frictional engaging area, and which at the same time is extremely compact, strong and effective. It will be seen at once that the parts are all contained within the friction drum, and this in turn within an oil-casing, if required, while a wide range of movement of the controlling mechanism and actuating screw permits a finer cut thread than is obtainable with any other construction now in use. Thus a very powerful, positively-actuated clutch is constructed upon lines giving an immense leverage and involving only a slight increase in the weight and strength of the parts to double the effective horse-power transmitted through the clutch.

Having now described and shown certain types of clutch mechanism, embodying my present invention, I claim as new and desire to secure by Letters Patent, the following:—

1. In a screw-actuated friction clutch mechanism, the combination with an expansible clutch-member, of an actuating screw disposed therein to open and close said member, a coacting tapped sleeve for said screw, a split socket mounting the sleeve, and means for securing it in its positions of rotatable adjustment with respect to the screw and the clutch-member, substantially as set forth.

2. In a screw-actuated friction clutch mechanism, the combination with its expansible clutch-member, of a right and left hand screw mounted to open and close the same, tapped sleeves for engaging the screw, a split socket mounting the sleeve within each of the opposing portions of the expansible member, and means for securing said sleeves in their positions of adjustment with respect to the member and the screw, substantially as set forth.

3. In a screw-actuated friction clutch mechanism, the combination with its expansible clutch member, of a right and left hand screw mounted to open and close the same, tapped sleeves for engaging the screw, mounted within opposing portions of the expansible member and means for securing said sleeves in their positions of adjustment with respect to the member and the screw, comprising recessed slotted lugs within the opposing portions of the clutch-member and associated compression bolts for rigidly engaging the tapped sleeves, substantially as set forth.

4. In a friction clutch mechanism, the combination with a cylindrical clutch-member or drum, of an interiorly-positioned expansible member comprising two pivoted segmental parts, means comprising a screw mechanism for effecting their contraction and their expansion into engagement with said drum, a support or hanging for said expansible member, and lugs or stops provided thereon, against which the expansible member is adapted to be drawn and held in position of disengagement from the drum, substantially as set forth.

Signed at Cleveland, this 11th day of December, 1905, in the presence of two subscribing witnesses.

GEORGE LAWRENCE BROWN.

Witnesses:
    JOHN F. MCDONNELL,
    EDWARD H. WALSH.